(12) United States Patent
Eskicioglu et al.

(10) Patent No.: US 9,439,125 B2
(45) Date of Patent: *Sep. 6, 2016

(54) LOCATION-BASED, EVENT TRIGGERED INTER-RADIO ACCESS TECHNOLOGY HANDOVERS FROM A CDMA MACROCELL TO A WCDMA FEMTOCELL

(75) Inventors: Suat Eskicioglu, Ottawa (CA); Cristian Demetrescu, Maidenhead (GB)

(73) Assignee: Alcatel Lucent, Boulogne-Billancourt (FR)

( * ) Notice: Subject to any disclaimer, the term of this patent is extended or adjusted under 35 U.S.C. 154(b) by 1678 days.

This patent is subject to a terminal disclaimer.

(21) Appl. No.: 12/272,911

(22) Filed: Nov. 18, 2008

(65) Prior Publication Data

US 2010/0124931 A1    May 20, 2010

(51) Int. Cl.
*H04W 40/00* (2009.01)
*H04W 36/32* (2009.01)
(Continued)

(52) U.S. Cl.
CPC ......... *H04W 36/32* (2013.01); *H04W 36/0094* (2013.01); *H04W 36/14* (2013.01); *H04W 84/045* (2013.01)

(58) Field of Classification Search
CPC ........... H04W 84/045; H04W 52/244; H04W 24/02; H04W 36/04; H04W 88/08; H04W 48/16; H04W 24/10; H04W 72/082; H04W 72/0453; H04W 16/14; H04W 8/005; H04W 12/08; H04W 16/10; H04W 16/16; H04W 24/00; H04W 4/02; H04W 52/143; H04W 64/00; H04W 52/143; H04L 41/0806; H04L 43/0823; H04L 43/16; H04L 45/50; H04L 5/14; H04L 65/1006; H04L 1/00; H04L 1/0002; H04L 1/0019; H04L 1/0025; H04L 1/0046; H04L 1/009; H04L 1/0091; H04L 1/1607; H04L 2001/0097; H04L 23/02; H04L 25/038
USPC ......... 370/328, 331–333; 455/440, 436, 444, 455/446
See application file for complete search history.

(56) References Cited

U.S. PATENT DOCUMENTS

| 5,396,647 | A |   | 3/1995 | Thompson et al. |
|---|---|---|---|---|
| 5,953,670 | A | * | 9/1999 | Newson ........................ 455/454 |

(Continued)

FOREIGN PATENT DOCUMENTS

| EP | 1 081 978 | 7/2001 |
|---|---|---|
| EP | 1 638 360 | 3/2006 |

(Continued)

OTHER PUBLICATIONS

International Search Report PCT/IB2009/055239 dated Jun. 4, 2010 and Written Opinion.

(Continued)

*Primary Examiner* — Marsha D Banks Harold
*Assistant Examiner* — Natasha W Cosme
(74) *Attorney, Agent, or Firm* — Davidson Sheehan LLP (57) ABSTRACT

The present invention provides a method for implementation in mobile unit that is configured to communicate with a wireless communication system that includes macrocells and femtocells. The macrocells and the femtocells use different generation radio access technologies. The method includes determining a distance between the mobile unit and the femtocell(s) and transmitting a first measurement report when the distance between the mobile unit and the femtocell(s) is less than a threshold distance. The method also includes performing an inter-radio access technology handoff from the base transceiver station to the femtocell when the distance is less than a threshold distance.

13 Claims, 3 Drawing Sheets

(51) Int. Cl.
*H04W 36/00* (2009.01)
*H04W 36/14* (2009.01)
*H04W 84/04* (2009.01)

(56) References Cited

U.S. PATENT DOCUMENTS

| | | |
|---|---|---|
| 6,327,471 B1 | 12/2001 | Song |
| 6,611,688 B1 | 8/2003 | Raith |
| 7,260,399 B1* | 8/2007 | Oh et al. .................. 455/436 |
| 7,577,443 B1* | 8/2009 | Moll et al. .............. 455/456.1 |
| 2002/0082017 A1 | 6/2002 | Hattori |
| 2002/0187792 A1 | 12/2002 | Kato et al. |
| 2005/0130662 A1 | 6/2005 | Murai |
| 2005/0250496 A1 | 11/2005 | Hason et al. |
| 2006/0034204 A1 | 2/2006 | Lee et al. |
| 2007/0105527 A1 | 5/2007 | Nylander et al. |
| 2008/0076420 A1 | 3/2008 | Khetawat et al. |
| 2008/0132239 A1 | 6/2008 | Khetawat et al. |
| 2008/0261596 A1 | 10/2008 | Khetawat et al. |
| 2008/0267153 A1 | 10/2008 | Mukherjee et al. |
| 2008/0299992 A1* | 12/2008 | Eitan et al. ............. 455/456.5 |
| 2009/0005031 A1 | 1/2009 | Van Lieshout et al. |
| 2009/0092122 A1* | 4/2009 | Czaja et al. ............. 370/350 |
| 2009/0093251 A1* | 4/2009 | Cai et al. ................ 455/436 |
| 2009/0093252 A1* | 4/2009 | Czaja et al. ............. 455/436 |
| 2009/0129263 A1* | 5/2009 | Osborn .................. 370/230 |
| 2009/0163216 A1 | 6/2009 | Hoang et al. |
| 2009/0176507 A1* | 7/2009 | Wu et al. ................ 455/456.2 |
| 2009/0196253 A1* | 8/2009 | Semper ................. 370/331 |
| 2009/0247170 A1* | 10/2009 | Balasubramanian et al. ............. 455/445 |
| 2009/0310561 A1* | 12/2009 | Grob et al. ............ 370/331 |
| 2009/0325583 A1 | 12/2009 | Burgess et al. |
| 2010/0048176 A1 | 2/2010 | Osborn |
| 2010/0085940 A1* | 4/2010 | Murphy ............... 370/331 |
| 2010/0111035 A1 | 5/2010 | Eskicioglu et al. |
| 2010/0112999 A1 | 5/2010 | Eskicioglu |
| 2010/0113035 A1 | 5/2010 | Eskicioglu |
| 2010/0113038 A1 | 5/2010 | Eskicioglu |
| 2010/0124927 A1 | 5/2010 | Eskicioglu et al. |
| 2010/0124931 A1 | 5/2010 | Eskicioglu |
| 2010/0240397 A1* | 9/2010 | Buchmayer et al. ....... 455/456.1 |

FOREIGN PATENT DOCUMENTS

| | | |
|---|---|---|
| EP | 1 753 259 | 2/2007 |
| GB | 2 377 130 | 6/2001 |
| GB | 2 389 005 | 5/2002 |
| WO | WO 9313618 | 7/1993 |
| WO | WO 0035230 | 6/2000 |
| WO | WO 00/70897 | 11/2000 |
| WO | WO 2008/030956 | 3/2008 |
| WO | WO 2008/131591 | 6/2008 |
| WO | WO 2008066928 | 6/2008 |
| WO | WO 2008075078 | 6/2008 |

OTHER PUBLICATIONS

International Search Report and Written Opinion correlating to PCT/IB2009/055210 dated Jun. 2, 2010, 28 pages.
International Search Report and Written Opinion correlating to PCT/IB2009/055209 dated Jun. 4, 2010, 28 pages.
International Search Report and Written Opinion correlating to PCT/IB2009/055214 dated Mar. 8, 2010, 12 pages.
International Search Report and Written Opinion correlating to PCT/IB2009/055213 dated Mar. 4, 2010, 17 pages.
International Search Report correlating to PCT/IB2009/055238 dated Mar. 4, 2010.
"Text Proposal Capturing Agreements on RRC Connection Reject Handling and T302, T303, T305", NTT Docomo Inc, Aug. 18, 2008, 10 pages.
"3rd Generation Partnership Project; Technical Specification Group Radio Access Network; UTRAN Architecture for 3G Home NodeB; Stage 2 (Release 8)" 3 GPP TS 25.467 V0.0.1, Oct. 31, 2008, 10 pages.
"3rd Generation Partnership Project; Technical Specification Group Radio Access Network; Radio Resource Control (RRC); Protocol Specification" 3 GPP TS 25.331 V8.4.0, Sep. 2008, 1,543 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" 3 GPP TS 36.300 V8.6.0, Sep. 2008, 137 Pages.
"Reply LS on inclusion of MNC and MCC in RRC Connection Setup Complete message" 3 GPP TSG RAN WG3 Meeting #61, May 12, 2008, 2 pages.
"Some open issues of CSG inbound mobility" 3 GPP TSG-RAN WG2 Meeting #67bis, Oct. 12, 2009, 7 pages.
"Inbound Mobility Proximity report options" 3 GPP TSG-RAN WG2 Meeting #67, Aug. 24, 2009, 6 pages.
"Measurement configuration for HNB inbound mobility for Rel-9 Ues" 3 GPP TSG-RAN WG2 Meeting #67bis, Oct. 12, 2009, 10 pages.
"Slight Revision of Baseline CR Capturing Agreements on Inbound Mobility" 3 GPP TSG-RAN2 Meeting #68, Nov. 9, 2009, 21 pages.

* cited by examiner

LOCATION-BASED, EVENT TRIGGERED INTER-RADIO ACCESS TECHNOLOGY HANDOVERS FROM A CDMA MACROCELL TO A WCDMA FEMTOCELL

CROSS REFERENCE TO RELATED APPLICATIONS

This application is related to U.S. patent application Ser. No. 12/265,089, filed on Nov. 5, 2008, entitled "LOCATION-BASED HANDOVERS FROM A MACROCELL TO A FEMTOCELL USING EVENT-TRIGGERED MEASUREMENT REPORT" inventors CRISTIAN DEMETRESCU and SUAT ESKICIOGLU.

This application is related to U.S. patent application Ser. No. 12/265,136, filed on, Nov. 5, 2008 entitled "LOCATION-BASED HANDOVERS FROM A MACROCELL TO A FEMTOCELL USING PERIODIC MEASUREMENT REPORTING" inventors CRISTIAN DEMETRESCU and SUAT ESKICIOGLU.

This application is related to U.S. patent application Ser. No. 12/265,173, filed on Nov. 5, 2008, entitled "METHOD FOR ASSOCIATING A CLUSTER OF PREMIER FEMTOCELLS WITH USER EQUIPMENT" inventors CRISTIAN DEMETRESCU and SUAT ESKICIOGLU.

This application is related to U.S. patent application Ser. No. 12/265,215, filed on Nov. 5, 2008, entitled "METHOD FOR ASSOCIATING A PREMIER FEMTOCELL WITH USER EQUIPMENT" inventors CRISTIAN DEMETRESCU and SUAT ESKICIOGLU.

This application is related to U.S. patent application Ser. No. 12/272,929, filed on Nov. 18, 2008, entitled "PERIODIC REPORTING FOR INTER-RADIO ACCESS TECHNOLOGY LOCATION-BASED HANDOVERS FROM A GSM MACROCELL TO A WCDMA FEMTOCELL" inventors CRISTIAN DEMETRESCU and SUAT ESKICIOGLU.

BACKGROUND OF THE INVENTION

1. Field of the Invention

This invention relates generally to communication systems, and, more particularly, to wireless communication systems.

2. Description of the Related Art

Conventional wireless communication systems use a network of base stations to provide wireless connectivity to one or more mobile units. In some cases, the mobile units may initiate wireless communication with one or more base stations in the network, e.g., when the user of the mobile unit would like to initiate a voice or data call. Alternatively, the network may initiate the wireless communication link with the mobile unit. For example, in conventional hierarchical wireless communications, a server transmits voice and/or data destined for a target mobile unit to a central element such as a Base Station Controller (BSC). The BSC may then transmit paging messages to the target mobile unit via one or more base transceiver stations or BTSs. The target mobile unit may establish a wireless link to one or more of the base transceiver stations in response to receiving the page from the wireless communication system. A radio resource management function within the BSC receives the voice and/or data and coordinates the radio and time resources used by the set of base transceiver stations to transmit the information to the target mobile unit. The radio resource management function can perform fine grain control to allocate and release resources for broadcast transmission over a set of base transceiver stations.

A conventional base station provides wireless connectivity within a geographical region that is referred to as a cell, a macrocell, and/or a sector. Conventional base transceiver stations can transmit signals using a predetermined amount of available transmission power. The range of the macrocell is determined by numerous factors including the available transmission power, angular distribution of the available power, obstructions within the macrocell, environmental conditions, and the like. For example, the range of a macrocell can vary from as little as 300 m in a densely populated urban environment to as much as 10 km in a sparsely populated rural environment. The coverage area can also vary in time if any of these parameters changes.

One alternative to the conventional hierarchical network architecture is a distributed architecture including a network of access points, such as base station routers, that implement distributed communication network functionality. For example, each base station router may combine Radio Network Controller (RNC) and/or PDSN functions in a single entity that manages radio links between one or more mobile units and an outside network, such as the Internet. Base station routers wholly encapsulate the cellular access technology and may proxy functionality that utilizes core network element support to equivalent IP functions. For example, IP anchoring in a UMTS base station router may be offered through a Mobile IP Home Agent (HA) and the GGSN anchoring functions that the base station router proxies through equivalent Mobile IP signaling. Compared to hierarchical networks, distributed architectures have the potential to reduce the cost and/or complexity of deploying the network, as well as the cost and/or complexity of adding additional wireless access points, e.g. base station routers, to expand the coverage of an existing network. Distributed networks may also reduce (relative to hierarchical networks) the delays experienced by users because packet queuing delays at the separate RNC and PDSN entities in hierarchical networks may be reduced or removed.

At least in part because of the reduced cost and complexity of deploying a base station router, base station routers may be deployed in locations that are impractical for conventional base stations. For example, a base station router may be deployed in a residence or building to provide wireless connectivity to the occupants of the residents of the building. Base station routers deployed in a residence are typically referred to as home base station routers or femtocells because they are intended to provide wireless connectivity to a much smaller area (e.g., a femtocell) that encompasses a residence. Femtocells have a much smaller power output than conventional base stations that are used to provide coverage to macrocells. For example, a typical femtocell has a transmission power on the order of 10 mW. Consequently, the range of a typical femtocell is much smaller than the range of a macrocell. For example, a typical range of a femtocell is about 100 m. Clusters of femtocells may also be deployed to provide coverage to larger areas and/or to more users.

Femtocells are expected to be deployed in conjunction with a macro-cellular network in an overlay configuration. For example, a macro-cellular network may be used to provide wireless connectivity to a neighborhood that includes numerous residences. Any mobile unit traveling through the neighborhood or located in one of the residences can access the wireless communication system using the macro-cellular network. Individual femtocells can be deployed in one or more of the residences to provide overlay coverage within (or near) the residence. Clusters of femtocells can also be deployed in one or more of the buildings to provide overlay coverage within (or near) the building. In either case, there will be a one-to-many relationship between the macrocells and the femtocells within the coverage area. However, mobile units will typically only be authorized to camp on selected femtocells. For example, mobile units operated by an individual user can be authorized to camp on femtocells that were installed by the user in their residence. For another example, mobile units operated by employees can be authorized to camp on femtocells in a femtocell cluster installed by a business.

In many cases, portions of the existing macro-cellular network have been in place for a period of time and may therefore be implemented using previous generation radio access technologies. Consequently, the relatively recently installed femtocells may use a more recent generation of radio access technology than the existing macrocells. For example, the wireless communication system may include second-generation macrocells and third generation femtocells. As the user moves throughout the geographic areas served by the macrocells and the femtocells, inter-radio access technology (inter-RAT) hand offs may be needed to handoff the mobile unit between the second-generation (2G) macrocells and the third generation (3G) femtocells. Conventional communication systems use radio conditions and/or the availability of radio resources to determine when to perform an inter-radio access technology hand off. For example, channel qualities and/or signal strengths can be measured using signals transmitted between the mobile unit and the macrocells and/or the femtocells. The conventional system hands off the mobile unit from a macrocell to a femtocell when the channel qualities and/or signal strengths for signals transmitted by the macrocell are poor relative to the measured channel qualities and/or signal strengths for the femtocell.

However, the conventional inter-RAT handoff criteria do not discriminate between generic femtocells, femtocells associated with particular mobile units, and macrocells. Consequently, mobile units may not be handed off to authorized home and/or business femtocells as long as the radio conditions in the macro-cellular network are sufficiently high quality, even if the user is inside the home or business covered by the associated femtocell. For example, radio conditions in the macro-cellular network may remain sufficiently high quality to prevent substantially all inter-RAT handovers to the femtocell, e.g., when the femtocell is deployed at the center of a macrocell coverage area.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for implementation in mobile unit that is configured to communicate with a wireless communication system that includes macrocells and femtocells. The macrocells and the femtocells use different radio access technologies. The method includes determining a distance between the mobile unit and the femtocell(s) and transmitting a first measurement report when the distance between the mobile unit and the femtocell(s) is less than a threshold distance. The method also includes performing an inter-radio access technology handoff from the base transceiver station to the femtocell when the distance is less than the threshold distance.

In another embodiment, a method is provided for implementation in a base station controller that is configured for deployment in a wireless communication system that includes macrocells and femtocells. The macrocells and the femtocells use different radio access technologies. The method includes receiving a first measurement report when a distance between the mobile unit and the femtocell is less than a threshold distance. The method further includes performing an inter-radio access technology handoff of the mobile unit from the base transceiver station to the femtocell when the distance between the mobile unit and the femtocell is less than the threshold distance.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
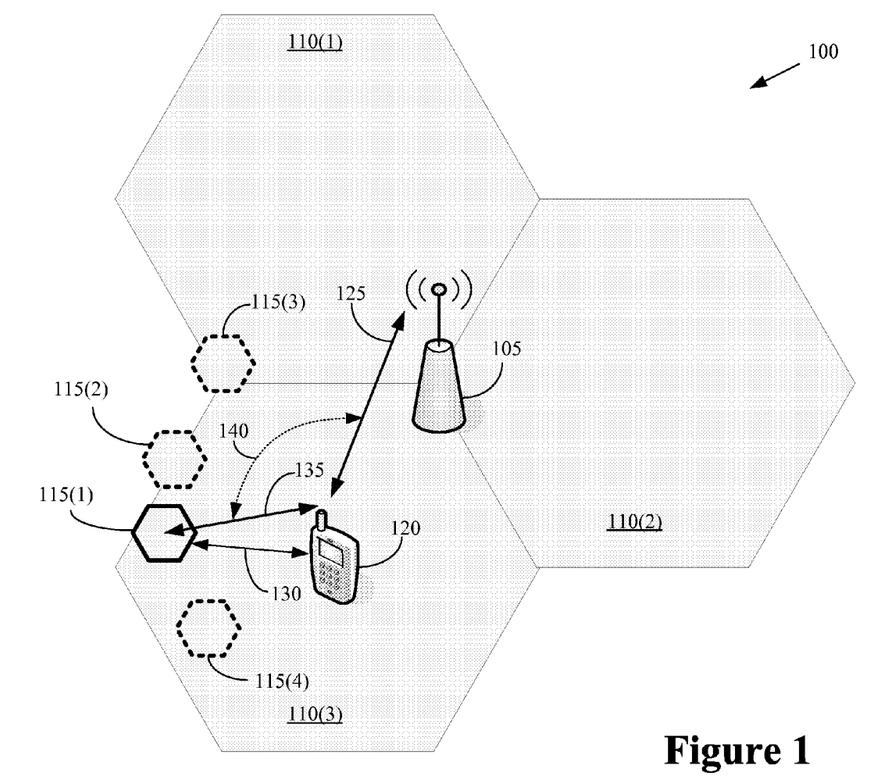
FIG. 1 conceptually illustrates a first exemplary embodiment of a wireless communication system.

FIG. 1 conceptually illustrates a first exemplary embodiment of a wireless communication system 100. In the illustrated embodiment, a base transceiver station (BTS) 105 provides wireless connectivity to a plurality of macrocells 110(1-3). Although the indices (1-3) can be used to identify individual elements such as the macrocell 110(1) or subsets of elements, these indices may be dropped when referring collectively to the macrocells 110. This convention may be applied to other elements depicted in the drawings and referred to using an identifying numeral and one or more distinguishing indices. In the illustrated embodiment, the macrocells 110 operate according to Second Generation (2G) standards and/or protocols such as Code Division Multiple Access (CDMA). However, in alternative embodiments the macrocells 110 may operate according to other standards and/or protocols including Global System for Mobile communications (GSM). The macrocells 110 shown in FIG. 1 correspond to different sectors associated with the BTS 105. For example, the BTS 105 may include three antennas (or three groups of antennas) that provide wireless connectivity to three sectors associated with the three macrocells 110. However, persons of ordinary skill in the art having benefit of the present disclosure should appreciate that alternative embodiments may use a different BTS 105 to provide wireless connectivity to each macrocell 110. Moreover, the wireless communication system 100 may include any number of macrocells 110 and/or BTSs 105. In alternative embodiments, the BTSs 105 may be a part of a hierarchical network or a distributed network.

The wireless communication system 100 also includes an overlay network of femtocells 115. For example, the femtocells 115 may be installed in businesses and/or residences by individual users, companies, or other entities. In the interest of clarity, only four femtocells 115 are depicted in FIG. 1. However, persons of ordinary skill in the art having benefit of the present disclosure should appreciate that the wireless communication system 100 may include any number of femtocells 115 distributed throughout the wireless communication system 100. The femtocells 115 operate according to a different radio access technology than the macrocells 110. In the illustrated embodiment, the femtocells 115 operate according to Third Generation standards and/or protocols. However, in alternative embodiments the femtocells 115 may operate according to other standards and/or protocols that differ from the standards and/or protocols used to implement the macrocells 110.

The wireless communication system 100 includes user equipment, such as the mobile unit 120 shown in FIG. 1, that are configured to communicate over the air interface using the standards and/or protocols implemented in both the macrocells 110 and the femtocells 115. The mobile unit 120 can therefore be associated with one or more of the femtocells 115. For example, a user that has installed the femtocell 115(1) in a residence can configure the mobile unit 120 to recognize the femtocell 115(1) as its premier femtocell. The mobile unit 120 may therefore preferentially handoff to the premier femtocell 115(1) when the mobile unit 120 approaches the premier femtocell 115(1). In one embodiment, the femtocell 115(1) may be part of a femtocell cluster (not shown in FIG. 1). However, in cases where the femtocell 115(1) and the macrocell 110(3) implement different radio access technologies, an inter-radio access technology (RAT) handover should be used to hand off to the femtocell 115(1) from the BTS 105 that provides connectivity for the macrocell 110(3).

The femtocell 115(1) is a premier femtocell for the mobile unit 120. As used herein, the term "premier femtocell" refers to a femtocell that has been associated with the mobile unit 120 so that the mobile unit 120 is authorized to preferentially access the premier femtocell. Exemplary situations in which a premier femtocell can be defined include femtocell installed by users in their homes, femtocells (or clusters of femtocells) installed in a place of business, and the like. Mobility information related to the premier femtocell 115(1) may be stored in the mobile unit 120 and network entities such as the base station 105 and/or a base station controller (not shown in FIG. 1) that is communicatively coupled to the base transceiver station 105. Exemplary mobility information includes, but is not limited to, information identifying the premier femtocell 115(1), information indicating a location of the premier femtocell 115(1), information indicating the radio access technology implemented by the premier femtocell 115(1), information indicating a frequency (or frequencies) used by the premier femtocell 115(1) for communication over the air interface, and the like.

In the illustrated embodiment, the mobile unit 120 has an existing wireless communication link 125 with the base transceiver station 105. For example, the mobile unit 120 may be in communication with the macrocell 110(3) via one or more antennas supported by the base transceiver station 105 using the link 125 that is established according to 2G CDMA standards and/or protocols. The mobile unit 120 may then determine a distance 130 between the mobile unit 120 and its premier femtocell 115(1). For example, the mobile unit 120 may compare its location to the location of the premier femtocell 115(1) to determine the distance 130. If the distance 130 is less than a selected distance threshold value, the mobile unit 120 may generate an inter-RAT event and send a message including the inter-RAT event to the base station 105 indicating that the location-based threshold for a handoff to the femtocell 115(1) has been reached. In embodiments that support inter-RAT channel quality measurements, the mobile unit 120 may also perform channel quality or signal strength quality measurements, e.g., using pilot channels transmitted by the base station 105 and/or the femtocell 115(1).

The wireless communication system 100 may then initiate an inter-RAT handoff of the mobile unit 120 from the 2G base transceiver station 105 and corresponding macrocell 110(3) to the 3G femtocell 115(1). A wireless communication link 135 between the mobile unit 120 and the premier femtocell 115(1) may be created (using the appropriate standards and/or protocols) and the mobile unit 120 may be handed off (as indicated by the dotted line 140) to the premier femtocell 115(1). In one embodiment, the wireless communication system 100 may also use other criteria, such as measures of the quality of the wireless communication link 135, to determine when to perform the location-based inter-RAT handoff. In the illustrated embodiment, the location-based inter-RAT handoff is only applied to premier femtocells 115(1) associated with the mobile unit 120.

Accordingly, the mobile unit 120 may be preferentially handed off to its premier femtocell 115(1) even though the air interface 125 to the macrocell 110(3) may be providing sufficiently high quality channel conditions or even channel conditions that are superior to the channel conditions supported by the air interface 135.

Figure 2:
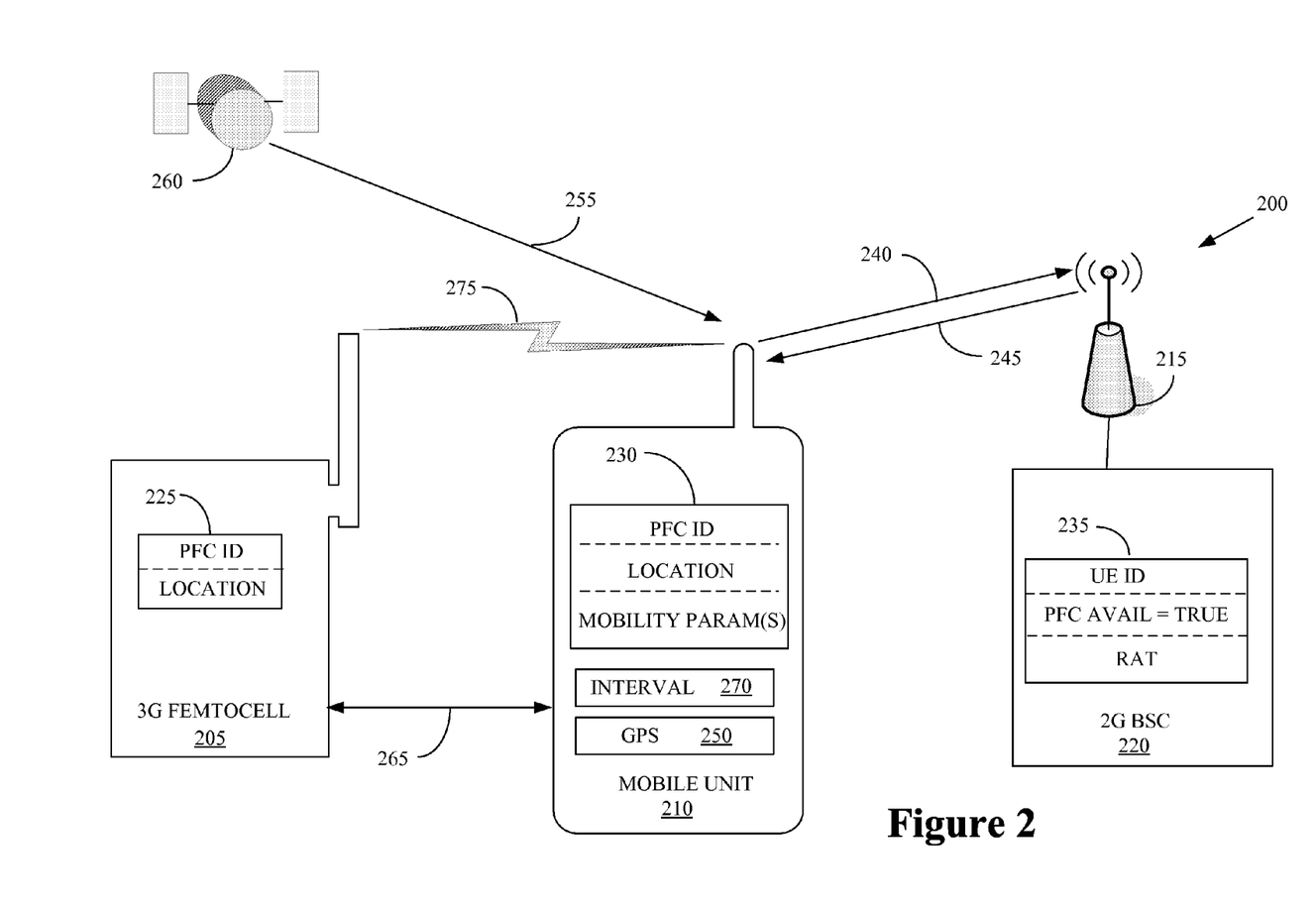
FIG. 2 conceptually illustrates a second exemplary embodiment of a wireless communication system.

FIG. 2 conceptually illustrates a second exemplary embodiment of a wireless communication system 200. In the illustrated embodiment, the wireless communication system 200 includes a 3G femtocell 205, mobile unit 210, a 2G base transceiver station 215, and a 2G base station controller (BSC) 220. Persons of ordinary skill in the art having benefit of the present disclosure should appreciate that the wireless communication system 200 may include other elements that are not depicted in FIG. 2 to avoid unnecessarily obscuring the discussion. The femtocell 205 is a premier femtocell for the mobile unit 210 and it operates according to a first set of standards and/or protocols, such as a Third Generation femtocell standard for a distributed architecture. In the illustrated embodiment, the femtocell 205 stores information 225 including a femtocell identifier and information indicating the location of the femtocell 205. The location information may be determined using numerous different techniques, including Global Positioning System (GPS) functionality incorporated into the femtocell 205 or manual configuration of the femtocell 205 by a user or a service provider. The base transceiver station 215 operates according to a second set of standards and/or protocols that differs from the first set of standards and/or protocols. For example, the base transceiver station 215 may operate according to a Second Generation standard.

The mobile unit 210 has been configured so that it recognizes the femtocell 205 as its premier femtocell. In the illustrated embodiment, the mobile unit 210 stores the identity of the premier femtocell 205, the location of the premier femtocell 205, and any other mobility parameters associated with the premier femtocell 205. Exemplary mobility parameters include, but are not limited to, primary scrambling codes (PSC), an international mobile subscriber identity (IMSI), a mobile identifier number (MIN), a UTRAN Radio Network Temporary Identifier (U-RNTI), and the like. In the illustrated embodiment, the mobile unit 210 defines a local variable, e.g. a data structure 230, to store the femtocell information relevant to mobility. In the illustrated embodiment, the mobile unit 210 stores the current cell information (relevant to mobility) and the location information (which may be provided by the femtocell 205 in a Connection Setup message) into the PremierFemtoCell local data structure 230 when a PremierFemtoCellAvailable Boolean value in the setup message from the femtocell 205 is set to TRUE.

The base station controller 220 maintains a context database 235 that stores context information associated with the mobile unit 210, as well as other user equipment and/or mobile units served by macrocells that are connected to the base station controller 220. In the illustrated embodiment, the base station controller 220 stores the information associated with the mobile unit 210 and information indicating that the mobile unit 210 is associated with a premier femtocell in a context 235 for the mobile unit 210. For example, the context 235 for the mobile unit 210 may include an identifier, a Boolean variable indicating that a premier femtocell is available, a parameter indicating the frequency used by the premier femtocell 205, and the location of the femtocell 205. Once the context 235 for the mobile unit 210 has been configured, the base station controller 220 knows that the mobile unit 210 is associated with a premier femtocell. Although the mobile unit 210 has been depicted as being associated with a single premier femtocell, persons of ordinary skill in the art having benefit of the present disclosure should appreciate that in alternative embodiments the mobile unit 210 may be associated with more than one premier femtocell.

In the illustrated embodiment, the mobile unit 210 is initially served by the base transceiver station 215 over a wireless communication link including an uplink 240 and a downlink 245 that are established according to the second set of standards and/or protocols. The mobile unit 210 is also aware of its location. In the illustrated embodiment, the mobile unit 210 includes Global Positioning System (GPS) functionality 250 to determine its location using signals 255 provided by a network of GPS satellites 260 (only one shown in FIG. 2). Alternatively, the mobile unit 210 can be made aware of its location using information provided by the base transceiver station 215 over the downlink 245. This approach can be referred to as an assisted-GPS technique. The mobile unit 210 can therefore use the stored location of the premier femtocell 205 to determine how far away the premier femtocell 205 is from the mobile unit 210.

The base station controller 220 can configure the mobile unit 210 for event-based triggering. In one embodiment, the base station controller 220 may define a location-based inter-RAT event that can be used to trigger an inter-RAT handoff from the base transceiver station 215 to the premier femtocell 205. For example, the mobile unit 210 may be configured to transmit a message including the location-based inter-RAT event when the distance between the premier femtocell 205 and the mobile unit 210 falls below a configured threshold distance. The threshold distance can be configured in any one of a variety of ways including pre-configuring the threshold distance, user configuration of the threshold distance (e.g., based on the size of a building served by the premier femtocell 205), and the like.

The base station controller 220 may also use other information, such as channel conditions if they are available, to determine whether to perform the inter-RAT hand off of the mobile unit 210 to the femtocell 205. For example, if the radio access technologies implement techniques for performing channel condition measurements on the target access technology in an inter-RAT handover, the channel conditions may be measured and the values of the measured channel conditions reported to the base station controller 220 in response to requests provided by the base station controller 220. For example, in the case of a location-based inter-RAT handover event, the base station controller 220 may instruct the mobile unit 210 to perform and report the channel condition measurements when the base station controller 220 receives the inter-RAT event message from the mobile unit 210. One example of a technique that is used in UMTS technologies is a compressed mode technique that allows mobile units to perform channel condition or signal strength quality measurements during specified time intervals. However, other radio access technologies such as 2G CDMA may not implement techniques for performing channel condition or signal strength quality measurements on the target access technology in an inter-RAT handover. For example, some radio access technologies implement blind handovers for inter-RAT handover.

Figure 3:
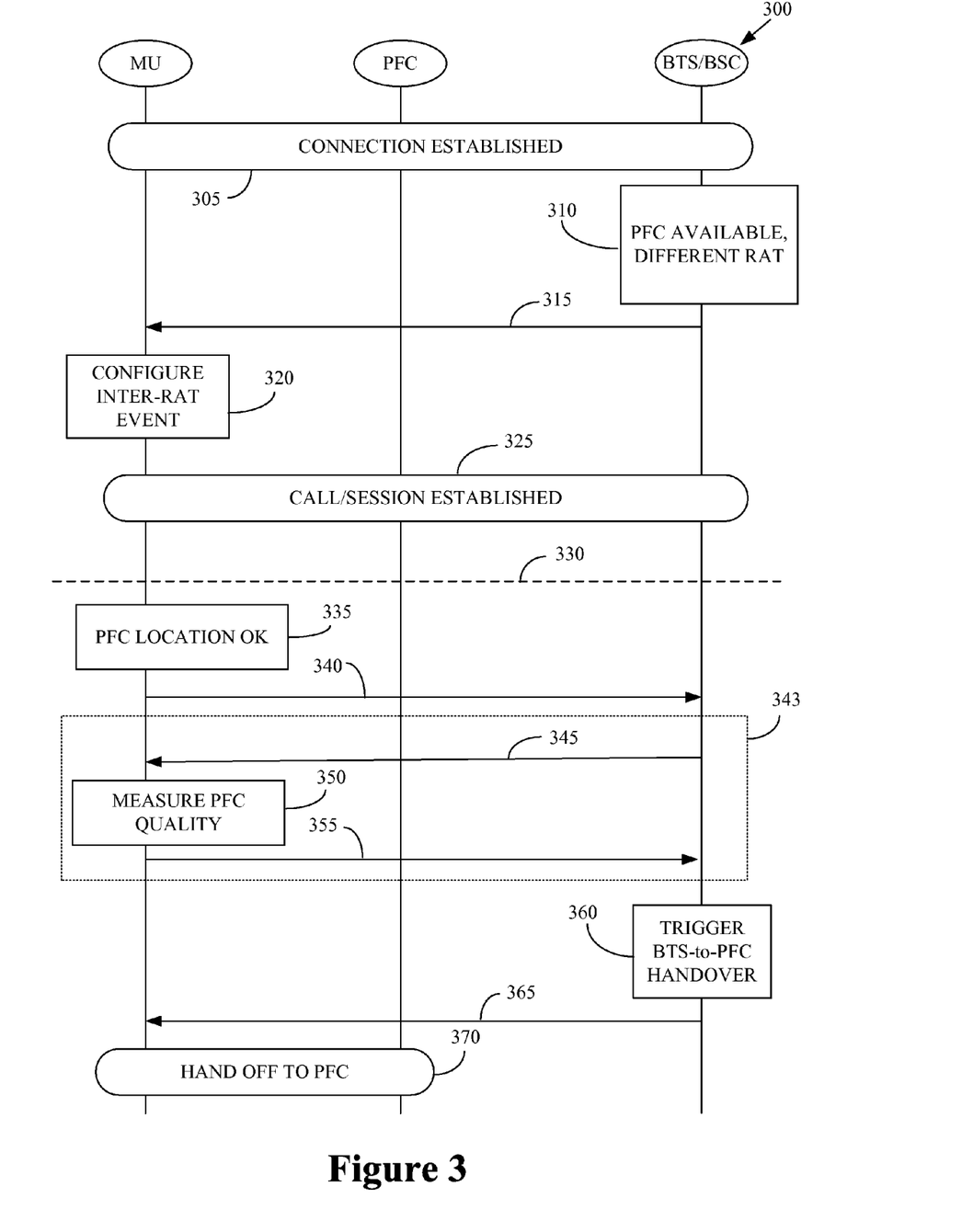
FIG. 3 conceptually illustrates a first exemplary embodiment of a method of handing off a mobile unit between a macrocell and a femtocell using event-based triggering.

FIG. 3 conceptually illustrates a first exemplary embodiment of a method 300 of handing off a mobile unit (MU) from a macrocell (BTS/BSC) to a premier femtocell (PFC) using event-based triggering. The macrocell and the premier femtocell use different radio access technologies for communications over the air interface. The first exemplary embodiment therefore depicts an inter-system (e.g. 2G CDMA to 3G femtocell) handoff procedure. Initially, a connection is established (at 305) between the mobile unit and the macrocell. The macrocell then determines (at 310) whether the mobile unit has an associated premier femtocell. For example, the macrocell may examine the context associated with the mobile unit to determine (at 310) whether the variable PremierFemtoCellAvailable is set to TRUE. In the illustrated embodiment, the mobile unit has an associated premier femtocell, so the macrocell also determines (at 310) the radio technology used by the premier femtocell to communicate with the mobile unit, which in the illustrated embodiment is different than the radio technology of the macrocell.

The macrocell then configures (at 315) the location-based inter-RAT event. The mobile unit receives this information and configures (at 320) the location-based inter-RAT event. The mobile unit may also store (at 320) parameters related to the location-based inter-RAT event including thresholds for the location-based handoff, thresholds for the channel quality needed for a handoff (if this information is available), and the like. A call and/or session may then be established (at 325) between the mobile unit and the macrocell. At this point in the process (indicated by the dashed line 330), the call or session between the mobile unit and the macrocell can proceed. However, the mobile unit continues to compare its location to the location of its premier femtocell and, in systems that implement techniques that permit inter-RAT signal strength quality measurements, to monitor the signal strength qualities associated with the air interface to the femtocell.

The mobile unit determines (at 335) that the distance between the mobile unit and the premier femtocell has fallen below a threshold value. For example, the mobile unit can compare (at 335) its current location to a location of the premier femtocell stored in the mobile unit's memory to determine the distance:

UE_PremierFemto_distance=UE_coordinates−premierFemto_coordinates

This distance can then be compared to the threshold and a handoff procedure can be triggered if:

UE_PremierFemto_distance<MacroToFemtoDistanceThreshold

When the distance criterion is satisfied, the mobile unit sends (at 340) an event-based measurement report that includes information indicating that the location-based event for inter-system handoff has occurred. In one embodiment, the base station controller (BSC) uses the location-based event included in the event-based measurement report to trigger (at 360) the inter-RAT handover of the mobile unit from the macrocell to the femtocell. For example, the base station controller (BSC) can send (at 365) a request to initiate the inter-RAT handover to the mobile unit. The mobile unit can then perform (at 370) an inter-RAT handover from the macrocell to the premier femtocell.

As discussed herein, different radio access technologies may or may not support inter-RAT signal strength quality measurements. If the radio access technologies involved in the handover depicted in FIG. 3 support inter-RAT channel or signal strength quality measurements, then the information gathered using these measurements can be used to decide whether to perform (at 370) the inter-RAT handover from the macrocell to the premier femtocell. The method 300 may then include the additional steps depicted in the box 343. In the illustrated embodiment, the macrocell responds (at 345) to the event-based measurement report by transmitting a message indicating that the mobile unit should perform measurements of the signal strength quality between the mobile unit and the premier femtocell. One exemplary technique for allowing the mobile unit to perform inter-RAT signal strength quality measurements is the compressed mode implemented in UTMS systems. However, other techniques may also be used to support measurement of the signal strength quality between the mobile unit and the premier femtocell.

When the mobile unit receives this message, the mobile unit measures (at 350) the signal strength quality, e.g., using a pilot channel transmitted by the femtocell. Information indicating the measured signal strength quality can then be reported (at 355) to the base station controller. The inter-RAT measurements could be reported either periodically or based on specific configured events. If the mobile periodically reports (at 355) the results of the inter-RAT measurements then the base station controller (BSC) can use the information included in the measurement reports to trigger (at 360) the inter-RAT handover of the mobile unit from the macrocell to the femtocell when the signal strength quality of the channel between the mobile unit and the femtocell is sufficiently high to support communication over the air interface providing that the distance based criteria is still met i.e. UE_PremierFemto_distance<MacroToFemtoDistanceThreshold. If the mobile unit transmits event-based inter-RAT measurement reports then the mobile unit can decide when the signal strength quality of the channel between the mobile and the femtocell is sufficiently high to support communication over the radio interface. In various alternative embodiments, the measurement report may also include other mobility information including, but not limited to, primary scrambling codes, timing and/or offset information, measures of the signal strength quality, and the like.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method implemented in a mobile unit that is configured to communicate with a wireless communication system that comprises at least one base transceiver station and at least one femtocell, said at least one base transceiver station using a different radio access technology than said at least one femtocell, the method comprising:
   receiving, at said mobile unit in a connection setup message transmitted by the at least one femtocell, information indicating coordinates of said at least one femtocell;
   receiving, at said mobile unit from said at least one base transceiver station, information indicating a threshold distance;
   determining, at said mobile unit, a distance between said mobile unit and said at least one femtocell by comparing coordinates of the mobile unit to the coordinates of said at least one femtocell;
   transmitting, from said mobile unit to said at least one base transceiver station, a first measurement report in response to the mobile unit determining that the distance between said mobile unit and said at least one femtocell is less than the threshold distance; and
   performing an inter-radio access technology handoff from said at least one base transceiver station to said at least one femtocell when the distance between said mobile unit and said at least one femtocell is less than the threshold distance.

2. The method of claim 1, comprising configuring, at said mobile unit, a first event using information generated at a base station controller and provided to said mobile unit by said at least one base received station, the first event being associated with an inter-radio access technology handoff from said at least one macrocell to said at least one femtocell.

3. The method of claim 2, wherein transmitting the first measurement report comprises transmitting a first measurement report including the first event and a request to activate an inter-radio access technology measurement.

4. The method of claim 3, comprising measuring a signal strength quality of a pilot channel transmitted by said at least one femtocell and performing the inter-radio access technology handoff when said signal strength quality is above a selected threshold.

5. The method of claim 4, comprising transmitting a second measurement report when said signal strength quality is above a selected threshold, the second measurement report comprising at least one of a primary scrambling code, timing information, offset information, a pilot channel signal-to-noise ratio, or a pilot channel received signal channel power.

6. The method of claim 4, comprising periodically transmitting second measurement reports comprising at least one of a primary scrambling code, timing information, offset information, a pilot channel signal-to-noise ratio, or a pilot channel received signal channel power.

7. The method of claim 1, comprising identifying said at least one femtocell as at least one premier femtocell associated with said mobile unit.

8. The method of claim 7, wherein identifying said at least one femtocell as at least one premier femtocell comprises:
   providing a call connection request from said mobile unit to said at least one femtocell;
   receiving, at said mobile unit from said at least one femtocell in response to providing the call connection request, information indicating that said at least one femtocell is a premier femtocell associated with said mobile unit; and
   storing the coordinates of the premier femtocell in said mobile unit.

9. A method involving a mobile unit that is configured to communicate with a wireless communication system that comprises at least one base transceiver station and at least one femtocell, said at least one base transceiver station using a different radio access technology than said at least one femtocell, the method comprising:
   receiving, at said mobile unit in a connection setup message transmitted by the at least one femtocell, information indicating coordinates of said at least one femtocell;
   receiving, at said mobile unit from said at least one base transceiver station, information indicating a threshold distance;
   determining, at said mobile unit, a distance between said mobile unit and said at least one femtocell by comparing coordinates of the mobile unit to the coordinates of said at least one femtocell; and
   performing an inter-radio access technology handoff of the mobile unit from said at least one base transceiver station to said at least one femtocell in response to the mobile unit determining that the distance between said mobile unit and said at least one femtocell is less than the threshold distance.

10. The method of claim 9, comprising transmitting, from said mobile unit to said at least one base transceiver station, a first measurement report in response to the mobile unit determining that said the distance between said mobile unit and said at least one femtocell is less than the threshold distance.

11. The method of claim 10, wherein performing the inter-radio access technology handoff comprises performing the inter-radio access technology handoff in response to said at least one base transceiver station receiving the first measurement report indicating that the distance is less than the threshold distance.

12. A method for implementation in a femtocell that is configured to communicate with a mobile unit, the femtocell using a different radio access technology than a base transceiver station configured to communicate with the mobile unit, the method comprising:
   transmitting, from the femtocell to the mobile unit, a connection setup message including information indicating coordinates of the femtocell; and
   performing an inter-radio access technology handoff of the mobile unit from the base transceiver station to the femtocell in response to a distance between the mobile unit and the femtocell being less than a threshold distance determined based on a comparison of coordinates of the mobile unit and the coordinates of the femtocell, wherein the threshold distance is provided to the mobile unit by the base transceiver station.

13. The method of claim 12, further comprising:

receiving, at the femtocell, a call connection request from the mobile unit; and transmitting, at from the femtocell in response to providing the call connection request, information indicating that said at least one femtocell is a premier femtocell associated with the mobile unit.

\* \* \* \* \*